June 6, 1950 G. DEAKIN 2,510,084

RECIPROCATING DRIVE MECHANISM FOR AUTOMATIC SELECTORS AND SIMILAR DEVICES

Filed Feb. 19, 1946 3 Sheets-Sheet 1

INVENTOR.
Gerald Deakin

BY Robert Harding Jr.
ATTORNEY

June 6, 1950

G. DEAKIN 2,510,084

RECIPROCATING DRIVE MECHANISM FOR AUTOMATIC SELECTORS AND SIMILAR DEVICES

Filed Feb. 19, 1946

3 Sheets-Sheet 2

INVENTOR.

Gerald Deakin

BY Robert Harding Jr.

ATTORNEY

June 6, 1950

G. DEAKIN 2,510,084

RECIPROCATING DRIVE MECHANISM FOR AUTOMATIC SELECTORS AND SIMILAR DEVICES

Filed Feb. 19, 1946

3 Sheets-Sheet 3

INVENTOR.
Gerald Deakin

BY Robert Harding Jr.
ATTORNEY

Patented June 6, 1950 2,510,084

UNITED STATES PATENT OFFICE 2,510,084

RECIPROCATING DRIVE MECHANISM FOR AUTOMATIC SELECTORS AND SIMILAR DEVICES

Gerald Deakin, New York, N. Y., assignor to International Standard Electric Corporation, New York, N. Y., a corporation of Delaware Application February 19, 1946, Serial No. 648,759

8 Claims. (Cl. 74—37)

The present invention relates to means for driving reciprocatory carriages such as brush carriages of selector switches, for example switches of this character used in automatic telephone systems as finder switches, group selectors, final connectors, marking switches or the like.

More particularly, this invention applies to driving means of the character wherein the reciprocatory carriage is connected alternately to parallel, oppositely moving reaches of an endless belt moving in one direction during each period of operation.

An object is to provide for a reciprocatory brush carriage or the like, a drive of the endless or continuous belt type which is novel and advantageous in construction and operation, which is easy to assemble and economical to manufacture, and which will operate satisfactorily over long periods of service with a minimum of attention.

Another object of the invention is a novel and advantageous reciprocatory carriage drive which will operate with a minimum of noise.

Another object is to provide for a reciprocatory carriage a novel and advantageous endless belt drive wherein a rotary member is advanced step-by-step as the carriage approaches the ends of its path to break connection with one reach of the belt and establish connection with the other.

Another object is to provide for a reciprocatory carriage a novel and advantageous endless belt drive wherein the belt is round and the means for grasping alternately two parallel reaches of the belt acts yieldably on said belt. The same results would be obtained with its inner side half-round irrespective of the shape at its outer side.

Another object is to provide for a reciprocatory carriage a novel and advantageous endless belt drive wherein there is a freely rotatable member having three resilient grasping devices equally spaced therearound and effective one at a time; and upon checking of the carriage the pull of the effective reach starts rotation of said rotatable member to effect release of the effective grasping device from said reach and engagement of the other reach by the grasping device in advance thereof, the two grasping devices then working together until the first is completely released whereupon the second grasping device is moved into full engagement with the second reach by the pull of that reach.

A further object of the invention is to provide for a reciprocatory carriage, an endless belt drive including a clutch which will work equally well for either direction of drive for the belt, in coupling the carriage to two parallel reaches of the belt.

A still further object of the invention is to provide a novel and advantageous endless belt drive for a reciprocatory carriage including a clutch on the carriage having a rotatable clutch member with three equally spaced yieldable devices to engage parallel belt reaches alternately, and detent means for said rotatable member.

Other objects, features and advantages will appear upon consideration of the following detailed description and of the drawings in which Fig. 1 is a fragmentary section as seen from above, illustrating one embodiment of the invention;

Figures 1, 2, 3, 4, 5:
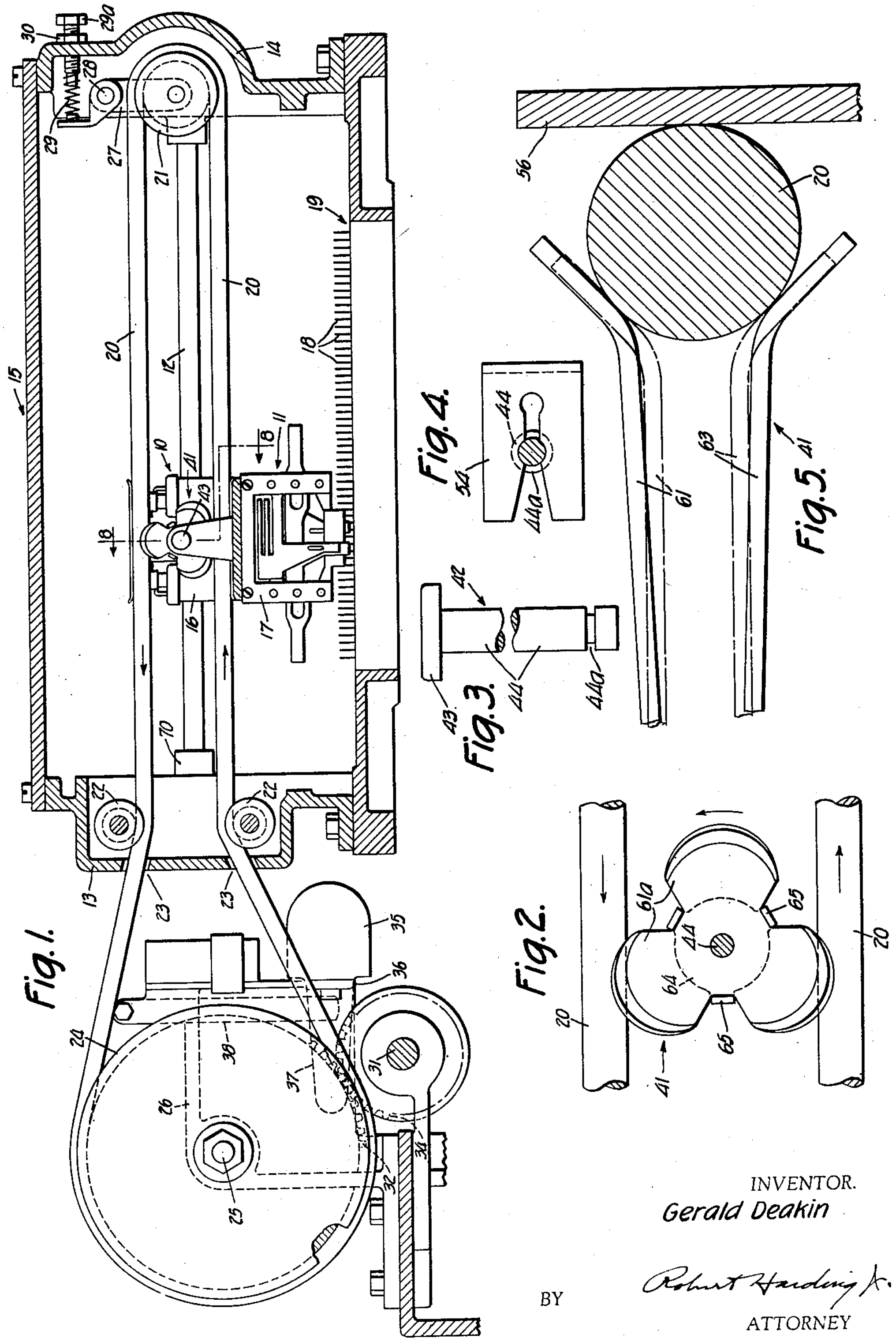
Fig. 2 is a fragmentary view illustrating the manner in which the clutch begins to release one reach of the belt and grip the other reach as the carriage arrives at the left end of its path (Fig. 1)
Fig. 3 illustrates a bolt on which a rotatable clutch device is mounted.
Fig. 4 illustrates a clip to hold the bolt in effective position.
Fig. 5 is a fragmentary view partly in section, illustrating the way in which the belt is clutched to the reciprocatory carriage.
Figure 8:
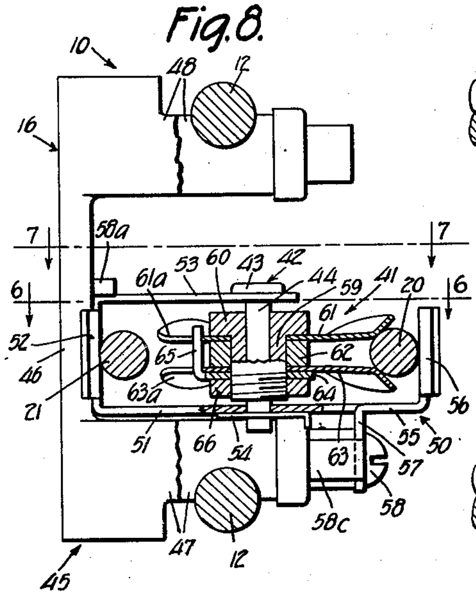
Fig. 8 is a section taken along the line 8—8 of Fig. 1.
Figure 9:
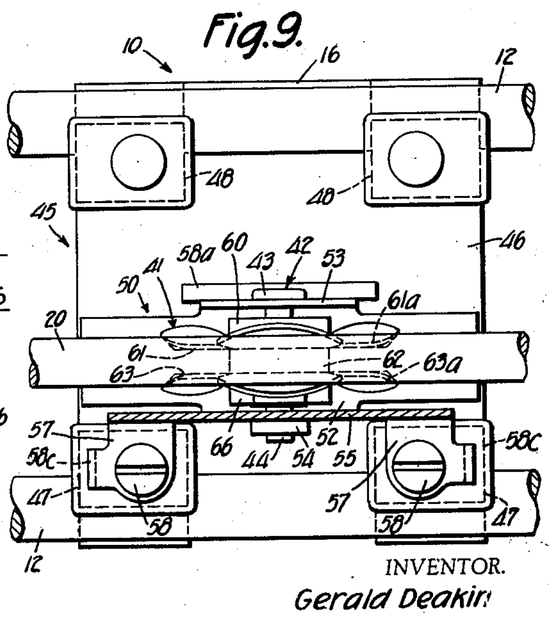
Fig. 9 is a view of the structure of Fig. 8, as seen from the right, parts being omitted to show underlying structure.

Referring more particularly to Figs. 1, 8 and 9, a frame 10 of a brush carriage 11 is mounted to slide along two fixed horizontal guides or rods 12 (Figs. 8 and 9). Said guides or guide rods 12 are secured at their ends to frame members 13 and 14 which may form part of a casing 15 in which the brush carriage 11 is reciprocated.

Said brush carriage frame 11 may be considered as made up of two parts, an outer part 16 and an inner part 17 which carries brush means to cooperate with terminals 18 of a flat terminal bank 19 and is no part of the present invention. Said outer part 16 of the carriage 11 carries belt-gripping means for alternately connecting the brush carriage to two parallel reaches of an endless belt 20 which is driven in one direction only.

As illustrated in Fig. 1, the endless belt 20 passes around a pulley 21 at the right end (Fig. 1) of the casing 15. From said pulley 21 extend parallel runs or reaches which at the other end of the casing pass between two guide rollers or pulleys 22 and then diverge through openings 23 in said frame or casing member 13 to the outside of the casing. Outside of the casing 15, the belt 20 passes around a large driving pulley or wheel 24 fixed on a short or stub shaft 25 journalled in a bracket 26 constituting part of the frame of the assembled apparatus. The belt may be kept taut by pivotally mounting the pulley 21 on a frame 27 pivoted at 28 and urged in the proper direction by means of a compression spring 29 and a screw 29*a* for adjusting the tension of the spring. The screw may be held in adjusted position by means of a lock nut 30.

The pulley 24 around which the belt 20 passes is driven by suitable clutch mechanism from a vertical shaft 31 which is motor driven in a manner that is well known in so-called rotary telephone exchange systems. For example, this clutch mechanism is similar to clutch mechanisms already in use and comprises a thin flexible gear 32 fixed to the lower end of stub shaft 33.

A gear 34 is secured on shaft 31 to rotate therewith and to mesh with flexible gear 32 which may however be flexed to disconnect it from gear 34. Gear 34 may be in the form of a thin disk and may be mounted between stiffener discs (not shown). The clutch is controlled by a clutch magnet 35 mounted on a flange of bracket 26 with its pivoted armature 36 at the bottom thereof. An arm 37 extends from the armature to a point beneath the flexible gear 32 near the point of engagement of the two gears, and when moved upwardly by a suitable spring 38 will flex gear 32 out of mesh with gear 34. Upon energization of the magnet, e. g. as a result of starting a call or dialing, the armature arm 37 will be swung downwardly against the action of the spring 38 and the flexible gear 32 will mesh with driving gear 34, thus causing movement of belt 20 and reciprocation of the brush carriage, the brushes acting under control of usual brush spreaders.

The flat terminal bank 19 is mounted between vertical frame elements 39 and 40 to which casing ends 13 and 14, respectively, are secured. Other banks 19 may be mounted above or below the bank shown in Fig. 1, and by merely turning the banks, the brush carriages and the driving means of a unit upside down, all of these parts could be used on the opposite side of the bay. If the gear 34 were used to drive a unit on the side of the bay opposite to that shown to be in use in Fig. 1, the pulley 24 would be below the associated flexible gear 32 and the corresponding banks 19 at opposite sides of the bay would be at different levels.

The structure thus far described is similar to structure described and claimed in my copending application Ser. No. 648,760, filed Feb. 19, 1946. However, the endless belt in said copending application is flat, whereas in the instant application the belt is round and the grooves in the peripheries of pulleys 21, 22 and 24 are rounded to accommodate said round belt 20.

According to the present invention, the outer part 16 of the brush carriage is provided with a novel and advantageous device for alternately gripping parallel reaches of the endless round belt 20 and causing the brush carriage to be reciprocated. The gripping device is especially adapted to act on a belt of round cross-section.

As disclosed in Figs. 1 through 9, the belt clutch comprises a rotatable device 41 in the general form of a clover leaf rotatably mounted for free rotation on a bolt or pivot 42 comprising a head 43 and a shank 44 provided at a point remote from the head with a circumferential groove 44*a*. The outer part 16 of the brush carriage is mounted directly on the guides 12 and contains the clover leaf clutch for the belt. Said part 16 comprises an outer frame 45 (Fig. 8) including a stiff central plate 46 with lower posts 47 projecting therefrom and having downwardly open half bearings resting on the lower rod 12, and upper posts 48 with upwardly facing half bearings receiving the upper rod or guide 12. Each of said posts 47 may be provided with an extension 49.

The rotatable clover leaf device is mounted in a resilient sheet-metal frame 50 having a central base portion 51 turned up at its inner edge and connected to a clamping element in the form of a plate 52 extending from edge to edge of plate 46 and curved around curved surfaces at the edges thereof. From the upper edge of plate 52, a tongue 53 extends upwardly and then outwardly and the outwardly extending portion of tongue 53 is tapered down to its outer end through which passes the pivot or shank 44 of bolt 42. The head 43 of bolt 42 rests against the upper face of tongue 53 and the shank 44 passes through an opening in base portion 51. The bolt 42 is locked in position by means of a split spring clip 54 (Fig. 4) of which the sides enter said groove 44*a*.

At its outer end the flat base portion 51 is connected to a wider portion 55 extending at each end to the outer sides of the lower posts 47. As illustrated in Fig. 8, said portion 55 is beneath the outer reach of belt 20 and turned up from its outer edge is a flange 56 turned outwardly at its ends. At the ends of said portion 55 opposite to the lower posts 47, metal parts 57 are turned down across the outer ends of extensions 49 and are pressed against the same by means of suitable devices such as screws 58. From the edges of said parts 57, fingers 58c project along said extensions to engage caps on posts 47. The sheet metal frame carrying the bolt 42 is held down at the plate 46 by a rib or lug 58a projecting from the plate.

The rotatable clover leaf 41 is mounted on the shank or pivot 44, by means of a sleeve or bushing 59 having a running fit on said shank or fixed shaft 44. Said bushing 59 has a head 60 at its upper end (Fig. 8) and at its other end is screw-threaded. Fitting on said bushing 59 next to said head 60 is a flexible resilient disk 61 of suitable material such as steel or a steel alloy. The ends of the arms or lobes 61a of said flexible disk or clover leaf 61 are turned upwardly at a uniform angle as indicated in Fig. 5.

Below said disk 61 is a spacer 62 which may be of any suitable material such as fibre and fits snugly on said bushing. Below said spacer 62 is a clover leaf disk 63 similar to disk 61 but with the ends of its arms 63a turned downwardly. Below said disk 63 is a snugly fitting washer 64 with arms 65 extending upwardly therefrom between the branches of the clover leaf disks 61 and 63 and serving to hold them in proper angular relation with respect to each other. A nut 66 is screwed on the threaded lower end of the bushing 59 so as to hold the various parts tightly together. The brush unit may be attached to the inner side of the frame 16 shown in Fig. 8.

At the end edges of the arms of the disks 61 and 63 portions of the metal are turned out of the plane of the disks and these turned out portions are between outer and inner arcs of which the outer arcs are of shorter radius. The clover leaf clutch has been described in accordance with the showing of Fig. 8. If, however, the unit were to be used at the other side of the bay, it would have to be inverted, that is, turned upside down.

Figure 6:
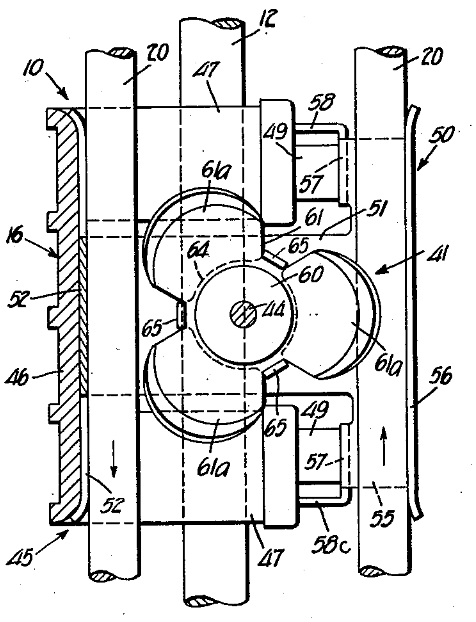
Fig. 6 is a fragmentary section taken along the line 6—6 of Fig. 8.

As illustrated in Figs. 1, 6 and 8, the brush carriage is connected to the outer reach of the belt which is traveling toward the left (Fig. 1). This movement of the carriage is produced principally by frictional engagement between the flange or clutch member 56 and the belt effected by corresponding spring arms of the disks 61 and 63. When the carriage is traveling freely with a reach of the belt 20, the effective spring arms are substantially perpendicular to this reach, and are spread to the full line positions shown in Fig. 5.

Figure 7:
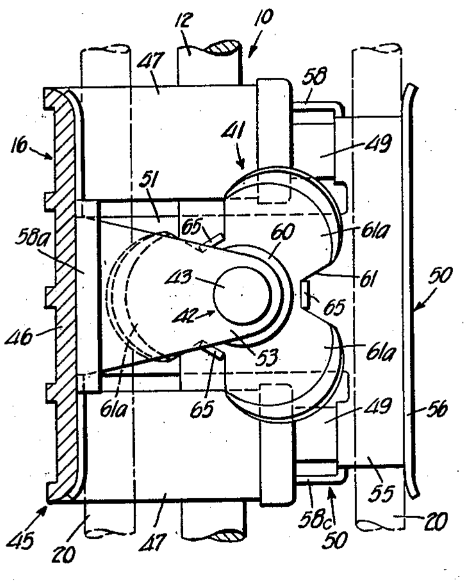
Fig. 7 is a fragmentary section taken along the line 7—7 of Fig. 8, but with the rotatable clutch member acting on the other reach of the belt.

As the carriage reaches the left end of its path, it strikes a stop or buffer 70. The carriage is then stopped and the pull of the driving reach starts the clover leaf to turning in a counterclockwise direction and brings the left inner branch of the clover leaf into engagement with the other or inner reach of the belt 20 as shown in Fig. 2. Both reaches of the belt act together at this time to continue the turning and disengage the clover leaf from the outer reach and connect it with the inner reach (Fig. 7). The pull of the inner reach completes the turning step and the brush carriage then travels to the right until it strikes a stop or buffer 71 and the clover leaf is turned through another 60° to disengage it from the inner reach and connect it to the outer reach. These operations will continue until the belt stops.

Upon inspection, it will be evident that the clover leaf clutch will operate equally well in both directions. Also the belt is yieldably gripped and is never engaged by a sharp edge. Thus there is no harsh use of the belt 20 which therefore should last for a long time. The belt is made of any suitable material. For example, the belt may be made of textile strands woven or braided in desired form, and impregnated with suitable plastic material such as neoprene.

The rotatable clutch device has some play along the pivot 44 but is adjusted in position by engagement of the pairs of spring arms with the reaches of said round belt 20. Each of these pairs comprises a spring arm 61a and a spring arm 63a. In Fig. 5 the full line positions of the arms indicates the positions for the full clamping effect, and the dot-and-dash positions indicate the positions at engagement of the arms with the reach of the belt 20 or the positions when they are about to leave the belt.

In Figs. 10 through 18, there is illustrated a second form of clutch according to the present invention. Mounted on guides 12 (Fig. 11) is a frame 45b and in this frame is mounted a clutch support 50b comprising a central base portion 51b turned up at its inner edge and connected to a clutch element in the form of a plate or flange 52b extending from edge to edge of plate 46b at the central part of frame 45b and curved around curved surfaces at the edges thereof. At its outer end the flat base portion 51b is connected to a wider portion 55b extending at each end to the outer sides of lower posts 47b projecting from the lower part of frame 45b. Said portion 55b is beneath the outer reach of belt 20 and turned up from its outer edge is a flange 56b turned outwardly at its ends. The flanges 52b and 56b serve as clutch members in supporting the reaches of the belt 20 against pressure exerted thereon by a rotatable clutch device 41b.

At the ends of said portion 55b of the clutch support 50b, parts or lugs 57b are turned down across extensions 49b of the lower posts 47b and are secured thereto by screws 58b. At plate 46b the clutch support is held down by rib or lug 58b projecting from the plate, and the ends of plate or flange 52b lie in grooves in the edges of said plate 46b.

Figures 10, 11, 12, 13, 14, 15, 16, 17, 18:
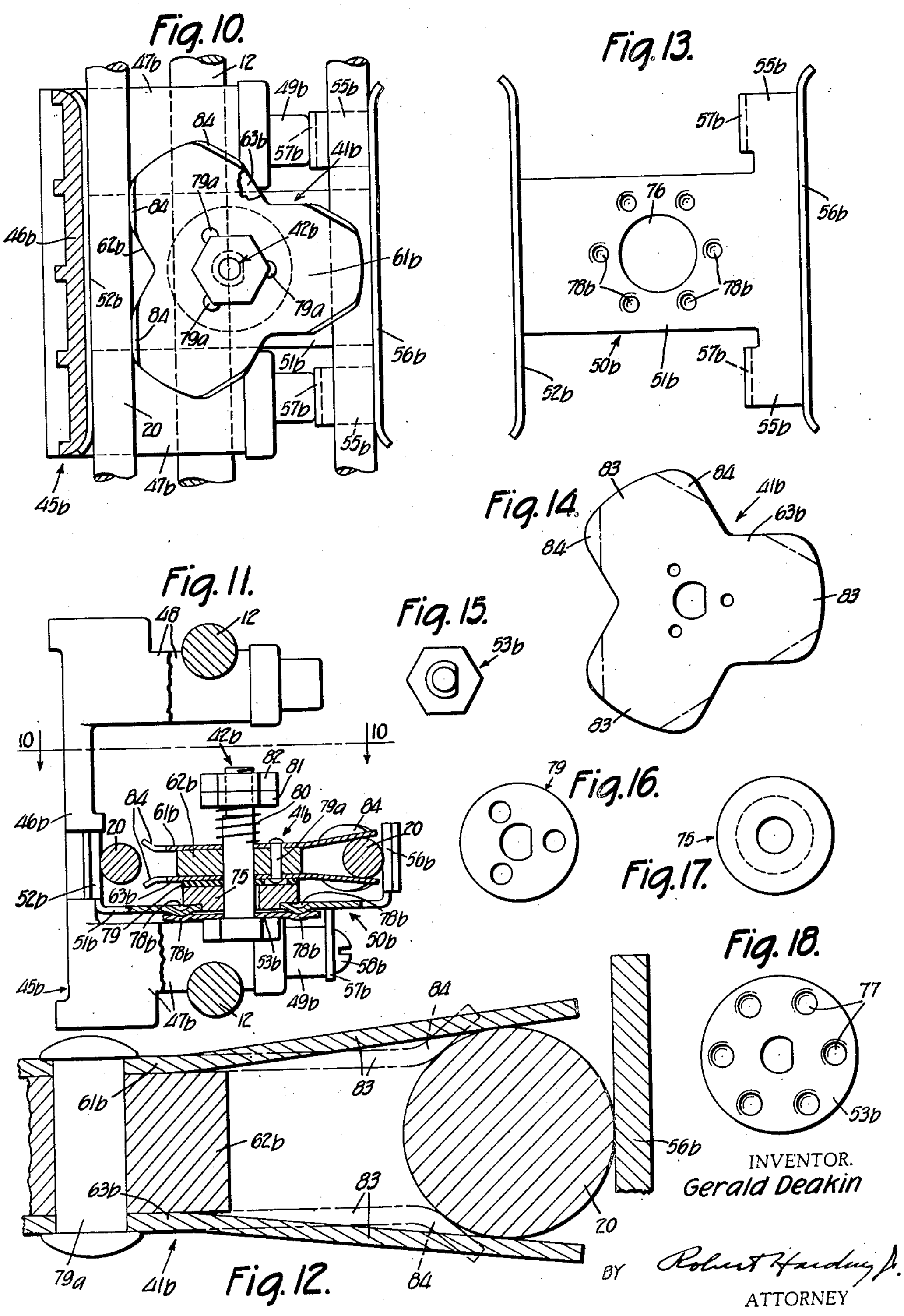
Fig. 10 is a section taken along the line 10—10 of Fig. 11 in illustration of a second form of the invention.
Fig. 11 is a sectional view corresponding to Fig. 8 which illustrates the first form of the invention.
Fig. 12 is a fragmentary view partly in section illustrating the manner of clutching the belt to the reciprocatory carriage.
Fig. 13 is a sheet metal member comprising a central portion to support a rotatable clutch device and at its ends flanges to support the belt against pressure exerted against the flexible clutch member.
Fig. 14 is a top plan view of one of two associated spring disks of the rotatable clutch device.
Fig. 15 is a view looking at the lower end of a bolt on which the rotary clutch device is mounted.
Fig. 16 is a top plan view of a spacer mounted between the two spring disks of the rotary clutch device.
Fig. 17 is a top plan view of a bushing having a lower portion to fit in the central opening of the device shown in Fig. 13, and a flange at the top to rest on the material surrounding said opening.
Fig. 18 is a plan view of a disk mounted on said bolt and having depressions to receive projections from the lower face of the central portion of the device shown in Fig. 13.

The rotatable clutch device 41b is mounted on said support 50b by means of a bolt 42b projecting upwardly through a disk 53b and the base 51b of said frame. As shown in Fig. 11, the shank of the bolt has a flat side and a reduced threaded end to which the plane of the flat side is tangent. The disk 53b has an opening with a flat side to fit over said bolt and prevent relative turning between the disk and the bolt. Above the disk the bolt passes through a round opening in a bushing 75 which fits in an opening 76 in the base 51b of the clutch support and has a flange resting on the top of said base. To resist relative rotation between the post 42b and the disk 53b, the disk is provided with a series of round depressions 77 arranged in a circle and cooperating with these are downward projections formed by making corresponding depressions 78 at the upper surface of the base 51b.

Resting on the top of the bushing 75 is a friction washer 79 of suitable material such as rubber, and this washer has an opening of suitable shape to prevent relative angular movement between the washer and the bolt. Resting on said washer 79 is the rotatable clutch member 41b which comprises two spring metal disks 61b and 63b separated by a spacer 62b of suitable material and these disks on opposite sides of the spacer may be secured together by suitable means such as rivets 79a with the heads at their lower ends projecting into openings in washer 79. Above the rotatable clutch member 41b is a helical spring 80 resting thereon and enclosing the shank of bolt 42b. On the threaded upper end of the shank of the bolt is mounted a nut 81 which when screwed down to normal position is locked in position by a lock nut 82.

The spring disks 61b and 63b are the same in shape but reversed in position. Each of these disks has three arms 83 with broad ends having corner portions 84 turned outwardly to assist in starting the spread of opposed arms 83. At their central portions the arms 83 are substantially straight. Fig. 12 shows in full marginal lines central sections of spring arms in full gripping position and in dot-and-dash marginal lines sections through the marginal portions of the spring arms when they are riding off the belt or on the same.

In operation, the rotatable clutch device 41b works in substantially the same way as the device 41 of the first form of the invention, but the successive positions of the device 41 are definitely determined by detent means already described as to structure. When the rotatable clutch member 41b grips the right hand reach of the belt (Figs. 10 and 11), device 41 will be in its Fig. 14 position and disk 53b will be in its Fig. 18 position with the six depressions 77 occupied by the six projections at the lower face of member 50b and these parts are pressed toward each other by spring 80.

There are six depressions at the upper face of disk 53b and six projections from the lower face of the base 51b. In turning the device 41b about its axis by the pull of the belt when the carriage strikes one of the stops, the connection between disk 53b and the shaft and parts carried thereby will be broken and the rotatable clutch member shifted with little resistance through an angle of 60° whereupon the parts will again lock automatically with the clutch connected to the other reach of the belt.

In the first form (Figs. 1 through 9), the rotatable clutch member turns freely and connection between the carriage and the belt is mainly due to friction connection between a reach of the belt and the belt support at its back, whereas in the second form the rotatable member is detained by the detent means and the spring arms resist movement of the carriage with respect to the adjacent reach.

It should be noted that in both forms disclosed the rotatable clutch member will operate for either direction of movement of the belt.

It should be understood that various changes may be made and that various features may be used without others, without departing from the true scope and spirit of the invention.

I claim:

1. In a selector, a reciprocable carriage, rectilinear guiding means therefor, an endless round driving belt therefor driven in one direction and having oppositely driven parallel reaches parallel to said guiding means, and clutching means on said carriage including belt supports outside of said reaches, a pivot midway between said reaches and perpendicular to the plane thereof, a rotatable clutch member on said pivot comprising pairs of opposed spring arms of sheet material at intervals of 120°, the ends of each pair having outturned portions to spread the arms to grip the round belt therebetween, and detent means to position and retain each pair of arms in gripping position.

2. In a selector having an endless belt drive, a frame to support a brush unit, rectilinear guiding means therefor, a subframe attached to the first mentioned frame having a base with a central opening, a bushing in said opening with a flange resting on said base, a circular series of six projections at the bottom of said base, a washer having at its upper side depressions to receive said projections and a central opening with a flat side, a bolt with a flat side projecting upwardly through said washer and locked thereto against relative rotation, a rotatable clutch device with a central portion fitted over said bolt, a spring around said bolt above the rotatable clutch device, and a nut to tension the spring.

3. The combination according to claim 2 wherein said sub-frame has supports outside said parallel reaches of said belt and said rotatable clutch device presses said parallel reaches alternately against said supports.

4. In a selector, a reciprocable carriage, rectilinear guiding means therefor, stops to limit the movement of said carriage, an endless driving belt having a rounded inner side and being driven in one direction with oppositely moving parallel reaches parallel to said guiding means, and clutching means on said carriage alternately connected to said reaches, including outside supports for said reaches, a pivot, a rotatable clutch member having at equal spaces therearound spring devices shaped to clutch said belt against said supports, said reaches advancing said rotatable clutch member one step each time the carriage strikes a stop.

5. In a selector, a reciprocable carriage, rectilinear guiding means therefor, stops to limit the movement of said carriage, an endless driving belt having a rounded inner side and being driven in one direction with oppositely moving parallel reaches parallel to said guiding means, and clutching means on said carriage alternately connected to said reaches, including outside supports for said reaches, a pivot, a rotatable clutch member having at equal spaces therearound spring devices shaped to clutch said reaches therebetween while pressing them against said supports, and detent means for said rotary clutch member.

6. In a selector, a reciprocable carriage, rectilinear guiding means therefor, stops to limit the movement of said carriage, an endless driving belt being driven in one direction and having oppositely moving parallel reaches parallel to said guiding means, and yieldable clutching means on said carriage alternately connected to said reaches, including outside supports for said reaches, a pivot, a rotatable clutch member having at equal spaces therearound spring devices shaped to clutch said belt against said supports, said reaches advancing said rotatable clutch member one step each time the carriage strikes a stop.

7. In a selector, a reciprocatory carriage, rectilinear guiding means therefor, an endless belt with a round inner side and having oppositely moving parallel reaches parallel to said guiding means, and yieldable clutch means on said carriage including belt supports outside of said reaches, a pivot midway between said reaches, a rotatable clutch device on said pivot comprising a spacer and at opposite sides thereof spring disks with notches at 120° intervals and providing spring arms, said arms having outturned corners to spread the opposed arms to grip the belt on opposite sides, and detent means for said rotatable clutch device.

8. In a selector, the combination of a terminal bank, a brush carriage mounted for reciprocatory movement in a path of limited length, and means for imparting reciprocatory movement to said carriage, including an endless belt with two oppositely-moving parallel reaches along said path, a clutch on said carriage including a single rotatable device between said reaches advanced a step by each stoppage of the carriage at the end of its path for clutching said reaches alternately, said device being rotatable in the direction of the moving belt upon reaching the end of the path and detent means to yieldably hold said clutch device in effective positions.

GERALD DEAKIN.

REFERENCES CITED

The following references are of record in the file of this patent:

UNITED STATES PATENTS

| Number | Name | Date |
|---|---|---|
| 607,986 | Davy et al. | July 26, 1898 |
| 1,774,356 | Cloud | Aug. 26, 1930 |
| 2,197,501 | Holden | Apr. 16, 1940 |
| 2,412,079 | Brustowsky | Dec. 3, 1946 |

FOREIGN PATENTS

| Number | Country | Date |
|---|---|---|
| 17,065 | Netherlands | Feb. 15, 1928 |